(12) United States Patent
Compagna et al.

(10) Patent No.: US 11,575,687 B2
(45) Date of Patent: Feb. 7, 2023

(54) HOLISTIC AND VERIFIED SECURITY OF MONITORING PROTOCOLS

(71) Applicant: SAP SE, Walldorf (DE)

(72) Inventors: Luca Compagna, La Roquette sur Siange (FR); Lorenzo Veronese, Vienna (AT); Stefano Calzavara, Mira (IT)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 17/172,011

(22) Filed: Feb. 9, 2021

(65) Prior Publication Data

US 2022/0255951 A1 Aug. 11, 2022

(51) Int. Cl.
*H04L 9/40* (2022.01)
*H04L 67/53* (2022.01)
*H04L 67/56* (2022.01)
*H04L 67/02* (2022.01)

(52) U.S. Cl.
CPC ...... *H04L 63/1408* (2013.01); *H04L 63/0281* (2013.01); *H04L 63/1433* (2013.01); *H04L 67/53* (2022.05); *H04L 67/56* (2022.05); *H04L 63/16* (2013.01); *H04L 63/20* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,554,930 | B2* | 10/2013 | Blakley, III | H04L 63/083 713/182 |
| 10,547,643 | B2* | 1/2020 | Varley | H04L 63/126 |
| 11,012,466 | B2* | 5/2021 | Gilmore | H04L 63/1441 |
| 2005/0268326 | A1* | 12/2005 | Bhargavan | H04L 63/20 726/1 |
| 2007/0006297 | A1* | 1/2007 | Verbowski | G06F 21/6218 726/16 |
| 2009/0282480 | A1* | 11/2009 | Lee | G06F 21/55 717/130 |
| 2019/0266328 | A1* | 8/2019 | Waldman | G06F 21/566 |
| 2021/0058447 | A1* | 2/2021 | Trufasiu | H04L 67/06 |

OTHER PUBLICATIONS

Veronese, et al., "Bulwark: Holistic and Verified Security Monitoring of Web Protocols", Universita Ca Foscari Venezia, SAP Labs France, Sep. 18, 2020 (18 pages).

* cited by examiner

*Primary Examiner* — Lashonda Jacobs-Burton
(74) *Attorney, Agent, or Firm* — Schwegman Lundberg & Woessner, P.A.

(57) ABSTRACT

Data is received that characterizes a computing architecture including at least one web-based server and an associated cryptographic web protocol to be implemented on such computing architecture according to a desired formal specification. Thereafter, a plurality of inattentive variants complying with the web protocol are generated without associated security checks. Messages to and from each inattentive variant are then monitored while executing the associated security checks. At least one security monitor is generated based on the monitored messages that is configured to address security vulnerabilities in the computing architecture relative to the formal specification. At least one generated security monitor can be later deployed in the computing architecture. Related apparatus, systems, techniques and articles are also described.

20 Claims, 5 Drawing Sheets

HOLISTIC AND VERIFIED SECURITY OF MONITORING PROTOCOLS

TECHNICAL FIELD

The subject matter described herein relates to advanced techniques for monitoring security protocols used by multi-party web applications.

BACKGROUND

Modern web applications often rely on third-party services to provide their functionality to users. The trend of integrating an increasing number of these services has turned traditional web applications into multi-party web apps (MPWAs) with at least three communicating actors. In a typical MPWA, a relying party (RP) integrates services provided by a trusted third party (TTP). Users interact with the RP and the TTP through a user agent (UA), which is typically a standard web browser executing a web protocol. For example, many RPs authenticate users through the Single Sign On (SSO) protocols offered by TTPs such as FACEBOOK, GOOGLE, TWITTER and use Cashier-as-a-Service (CaaS) protocols.

SUMMARY

In a first aspect, data is received that characterizes a computing architecture including at least one web-based server and an associated cryptographic web protocol to be implemented on such computing architecture according to a desired formal specification. Thereafter, a plurality of inattentive variants complying with the web protocol are generated without associated security checks. Messages to and from each inattentive variant are then monitored while executing the associated security checks. At least one security monitor is generated based on the monitored messages that is configured to address security vulnerabilities in the computing architecture relative to the formal specification. The generated at least one security monitor can be later deployed in the computing architecture.

The deploying can include one or more of: deploying a service worker registered by a relying party at a user agent, deploying a proxy at a relying party, deploying a proxy at a trusted third party, and/or deploying a service worker registered by a trusted third party at a user agent.

The generated at least one security monitor can search, in response to a trigger (i.e., a pre-defined event), a configuration file for a definition. Subsequently, a function specified by the definition can be called to deconstruct an object into its components. Such an object can take various forms including as a hypertext transfer protocol (HTTP) message.

The generating of the at least one security monitor can include iterating through a plurality of different available modifications to the computing architecture until a modification having a combination of inattentive participants and generated security monitors that complies with an ideal specification for the web protocol is identified. In some variations, the different available modifications can be iterated through based on increasing costs for deployment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for the secure integration of third party services that address vulnerabilities that might arise due to errors in the protocol specification, incorrect implementation practices at the RP and subtle bugs in the integration APIs provided by the TTP. In particular, the current subject matter automatically generates security monitors allowing only the web protocol runs which comply with the expected, ideal run. These security monitors can block or try to automatically fix protocol runs which deviate from the expected outcome.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a reliable and comprehensive framework for the security monitoring of web protocols in MPWAs. In particular, the current subject matter provides formally verified security monitors from formal specifications (e.g., applied pi-calculus specifications, equivalents of pi-calculus specifications, etc.) of web protocols in a manner that lends itself to the appropriate placement of such monitors to have full visibility of the attack surface, while using modern web technologies to support an easy deployment. The effectiveness of the current subject matter is demonstrated through testing against a pool of vulnerable web applications that use the OAuth 2.0 protocol or integrate the PayPal payment system. These tests shown that the current subject matter is able to successfully mitigate attacks on both the client and the server side.

Figure 1:
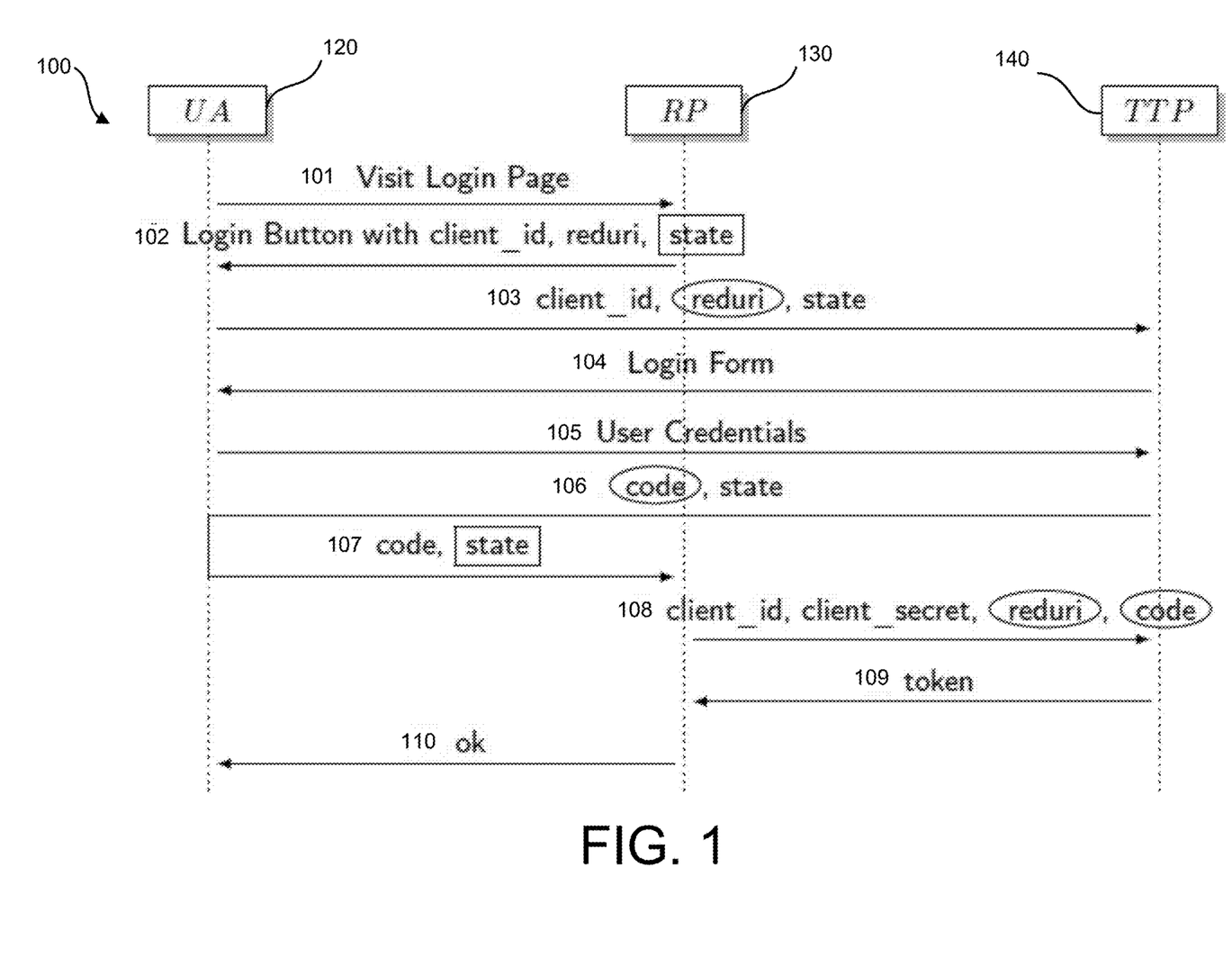
FIG. 1 is a messaging diagram illustrating an example cryptographic web protocol.

FIG. 1 is a diagram 100 illustrating a widely used web protocol, namely OAuth 2.0 in explicit mode, which allows a RP 130 to leverage a TTP 140 for authenticating a user operating a UA 120. The protocol starts (101) with the UA visiting the RP's login page. A login button is provided back that, when clicked, triggers a request to the TTP (102, 103). Such a request comprises: client id, the identifier registered for the RP at the TTP; reduri, the URI at RP to which the TTP will redirect the UA after access has been granted; and state, a freshly generated value used by the RP to maintain session binding with the UA. The UA authenticates with the TTP (104, 105), which in turn redirects the UA to the reduri at RP with a freshly generated value code and the state value (106, 107). The RP verifies the validity of code in a back-channel exchange with the TTP (108, 109): the TTP acknowledges the validity of code by sending back a freshly generated token indicating the UA has been authenticated. Finally, the RP confirms the successful authentication to the UA (110).

Implementing a protocol as in FIG. 1 is difficult which can result in vulnerabilities for malicious actors to exploit. Discussed below are two representative attacks with severe security implications for such a protocol.

Session Swapping. Session swapping exploits the lack of contextual binding between the login endpoint (102) and the callback endpoint (107). This is often the case in RPs that do not provide a state parameter or do not strictly validate it. The attack starts with the attacker signing in to the TTP and obtaining a valid code (106). The attacker then tricks an honest user, through cross-site request forgery (CSRF), to send the attacker's code to the RP, which makes the victim's UA authenticate at the RP with the attacker's identity. From there on, the attacker can track the activity of the victim at the RP. The RP can prevent this attack by checking that the value of state at 107 matches the one that was generated at 102. The boxed shapes around state represent this invariant in FIG. 1.

Unauthorized Login by Code Redirection. Code (and token) redirection attacks exploit the lack of strict validation of the reduri parameter and involve its manipulation by the attacker. The attacker crafts a malicious page which fools the victim into starting the protocol flow at 103 with valid client id and state from an honest RP, but with a reduri that points to the attacker's site. The victim then authenticates at the TTP and is redirected to the attacker's site with the code value. The attacker can then craft the request at 107 with the victim's code to obtain the victim's token (109) and authenticate as her at the honest RP. The TTP can prevent this attack by (i) binding the code generated at 106 to the reduri received at 103, and (ii) checking, at 108, that the received code is correctly bound to the supplied reduri. The rounded shapes represent this invariant in FIG. 1.

The following details aspect of a software-based tool that provides holistic security monitoring of web protocols. As used herein, the tool is referred to as Bulwark.

Bulwark utilizes a protocol verification tool (PVT) tailored for a formal specification of web-based protocols. One example, PVT is ProVerif which can be extended from traditional cryptographic protocols to web protocols by using the WebSpi library. In particular, WebSpi provides a ProVerif model of a standard web browser and includes support for important threats from the web security literature, e.g., web attackers, who lack traditional Dolev-Yao network capabilities and attack the protocol through a malicious website.

The current subject matter can start from a PVT model (i.e., a formal specification) of the web protocol to protect, referred to herein as an ideal specification, and can generate formally verified security monitors deployed as service workers or server-side proxies. This process builds on an intermediate step called monitored specification.

As one example of how the current subject matter can be applied, a scenario is provided in which a multi-party web application includes a TTP which offers integration to a set of RPs. It will be appreciated that the current subject matter is also applicable to different scenarios. The TTP starts by writing down its protocol as a PVT model, expressing the intended security properties by means of standard formal security properties about authentication and secrecy as supported by the PVT. For example, the code/token redirection attack against OAuth 2.0 (as described above) can be discovered through the violation of a correspondence assertion. The protocol can then be automatically verified for security violations and the TTP can apply protocol fixes until the PVT does not report any flaw. As the PVT is an automatic cryptographic protocol verification tool, this process eventually leads to a security proof for an unbounded number of protocol sessions, up to the assumptions underlying the PVT. For instance, a common assumption for these tools, that applies also to the web model of ProVerif and its WebSpi library, is "perfect cryptography" that assumes that the attacker cannot break cryptography unless she has the right cryptographic key. The formal models available nowadays (e.g., the WebSpi model) are expressive enough to model components of the modern Web to be able to capture all the attacks of Table 1.

TABLE 1

Attacks on OAuth 2.0 and PayPal

| Attack | Channels to observe | UA ext | RP sw | RP proxy | TTP sw | TTP proxy |
|---|---|---|---|---|---|---|
| *OAuth 2.0* | | | | | | |
| 1  307 Redirect attack [12] | UA↔TTP | ✓ | x | x | ✓ | ✓ |
| 2  Access token eavesdropping [21] | UA↔RP | ✓ | ✓ | ✓ | x | x |
| 3  Code/State Leakage via referer header [11, 12] | UA↔RP | ✓ | ✓ | ✓ | x | x |
| 4  Code/Token theft via XSS [21] | UA↔RP | ✓ | x | x | x | x |
| 5  Cross Social-Network Request Forgery [4] | UA↔RP | ✓ | ✓ | ✓ | x | x |
| 6  Facebook implicit AppId Spoofing [23, 20] | UA↔TTP | x | x | x | ✓ | ✓ |
| 7  Force/Automatic login CSRF [4, 21] | UA↔RP | ✓ | ✓ | ✓ | x | x |
| 8  IdP Mix-Up attack [12] (HTTP variant) | UA↔RP | x | x | ✓ | x | x |
| 9  IdP Mix-Up attack [12] (HTTPS variant) | UA↔RP | ✓ | ✓ | ✓ | x | x |
| 10  Naive session integrity attack [12] | UA↔RP | ✓ | ✓ | ✓ | x | x |
| 11  Open Redirector in OAuth 2.0 [17, 14] | UA↔{RP, TTP} | ✓ | ✓ | ✓ | ✓ | ✓ |
| 12  Resource Theft by Code/Token Redirection [4, 7] | UA↔TTP | ✓ | x | x | x | ✓ |

TABLE 1-continued

Attacks on OAuth 2.0 and PayPal

| | | | UA | RP | | TTP | |
|---|---|---|---|---|---|---|---|
| | Attack | Channels to observe | ext | sw | proxy | sw | proxy |
| 13 | Session swapping [21, 14] | UA↔RP | ✓ | ✓ | ✓ | x | x |
| 14 | Social login CSRF on stateless clients [4, 14] | UA↔RP | ✓ | ✓ | ✓ | x | x |
| 15 | Social login CSRF through TTP Login CSRF [4] | UA↔TTP | ✓ | x | x | ✓ | ✓ |
| 16 | Token replay implicit mode [20, 24, 14] | UA↔RP | ✓ | ✓ | x | x | x |
| 17 | Unauth. Login by Code Redirection [4, 14] | UA↔TTP | ✓ | x | x | x | ✓ |
| PayPal | | | | | | | |
| 18 | NopCommerce gross change in IPN callback [22] | RP↔{UA, TTP} | x | x | ✓ | x | x |
| 19 | NopCommerce gross change in PDT flow [22] | RP↔{UA, TTP} | x | x | ✓ | x | x |
| 20 | Shop for free by malicious PayeeId replay [20, 18] | RP↔{UA, TTP} | x | x | ✓ | x | x |
| 21 | Shop for less by Token replay [20, 18] | UA↔RP | x | x | ✓ | x | x |

Once verification is done, the TTP can use Bulwark to automatically generate security monitors for its RPs from the ideal specification, e.g., to complement the traditional protocol SDK that the TTP normally offers anyway with protection for RPs, which are widely known to be the buggiest participants. The TTP could also decide to use Bulwark to generate its own security monitors, so as to be protected even in the case of bugs in its own implementation.

Figure 2:
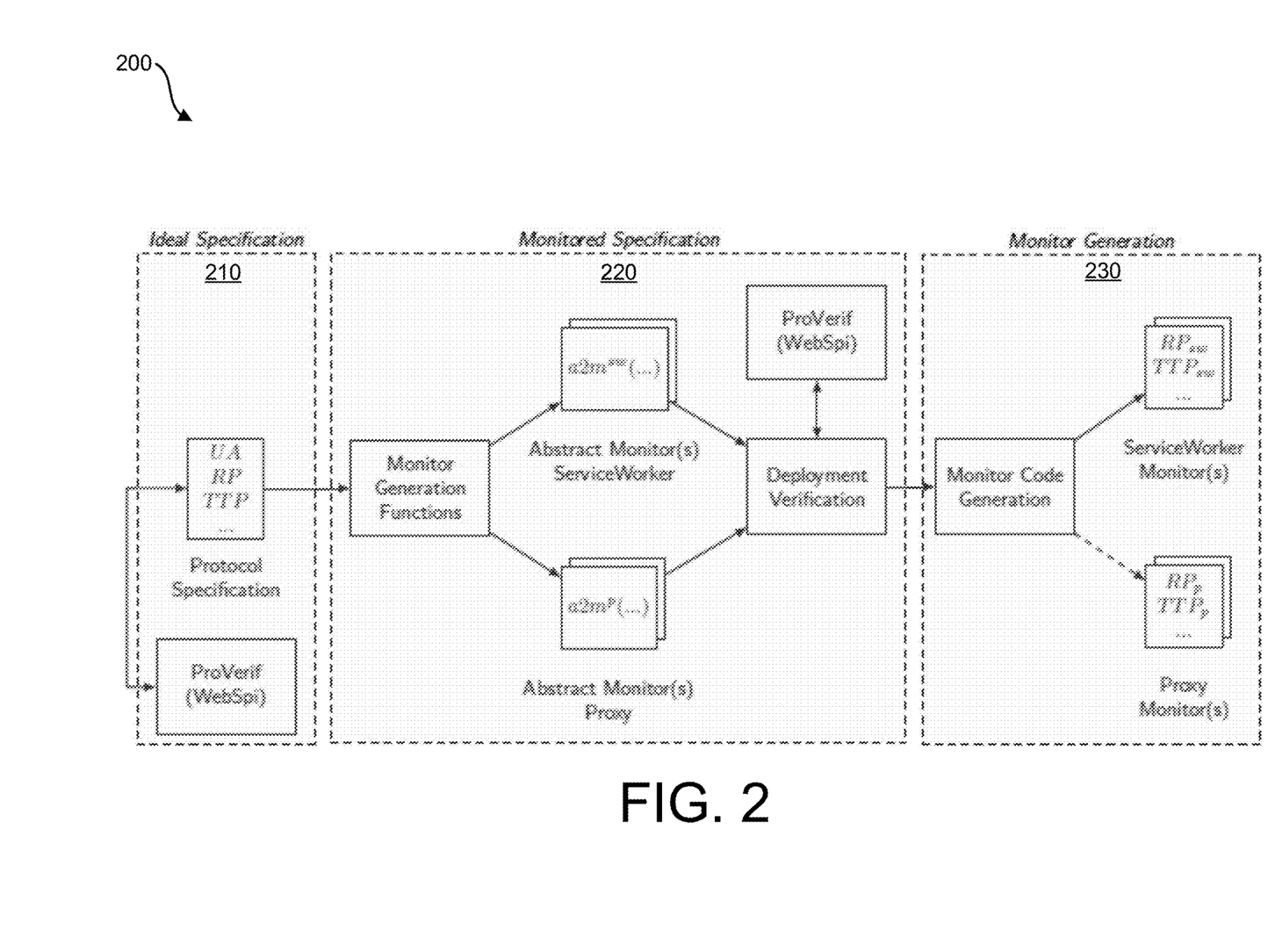
FIG. 2 is a diagram illustrating phases for providing holistic and verified security of monitoring protocols.

FIG. 2 is a diagram 200 illustrating aspects of the Bulwark including an ideal specification 210 for a particular web protocol, a monitored specification phase 220, and a monitor generation phase 230.

Monitored Specification. In the monitored specification phase 220, Bulwark relaxes the ideal assumption that all protocol participants are implemented correctly. In particular, user-selected protocol participants are replaced by inattentive variants which comply with the protocol flow, but forget relevant security checks. Technically, this is done by replacing the modeled PVT processes of the participants with new PVT processes generated by automatically removing from the honest participants all the security checks (pattern matches, get/insert and conditionals) on the received messages, which include the invariants represented by the boxed checks in FIG. 1. This approximates the possible mistakes made by honest-but-buggy participants, obtaining processes that are interoperable with the other participants, but whose possible requests and responses are a superset of the original ones. Intuitively, an inattentive participant may be willing to install a monitor to prevent attackers from exploiting the lack of forgotten security checks. On the other hand, a deliberately malicious participant has no interest in doing so.

Then, Bulwark extracts from the ideal specification 210 all the security invariant checks forgotten by the inattentive variants of the protocol participants and centralizes them within security monitors. This is done by applying two functions a2mp and a2msw, which derive from the participant specifications new PVT processes encoding security monitors deployed as a server-side proxy or a service worker respectively. The a2mp function is a modified version of a previous a2m function of, which generates security monitors for cryptographic protocols. The function can take the form as Algorithm 1 below in which the input is a PVT process P and returns the associated proxy monitor process. Specifically, each time P sends/waits for data on the channel c, the monitor interposes and relays the message from/to P over a new channel mch(c), after performing appropriate security checks. The function makes use of three variables: known tracks the values that are part of the knowledge of the monitor; buffers tracks all the messages that are received by the monitor and needs to be relayed to the process; delayedExps tracks the expressions that cannot be immediately executed by the monitor since they predicate on values that are not part of the known variables yet. When the knowledge is updated with the correct values, the monitor applies these delayed expressions to the newly available data.

Algorithm 1 Proxy Generation Function (Excerpt)

Input: Process P
Variables: known = ∅, buffers = ∅, delayedExps = ∅
1   procedure a2m$^P$(P)
2      if P is 0 then
3         return flushBuffers( ); 0
4      else if P is let d = t in P' then
5         if t ∈ known then
6            known ← knew ∪ {d}
7            return let d = t in a2m$^P$(P')
8         delayedExps ← delayedExps ∪ {let d = t}
9         return a2m$^P$(P')
10     else if P is insert table(t); P' then
11        if t ∈ known then
12           return insert table(t); a2m$^P$(P')
13        delayedExps ← delayedExps ∪ {insert table(t)}
14        return a2m$^P$(P')
15     else if P is new a; P' then
16        return a2m$^P$(P')
17     else if P is in(c, d); P' then
18        known ← known ∪ {d}
19        buffers ← buffers ∪ {(mch(c), d)}
20        return in(c, d); a2m$^P$(P')
21     else if P is out(c, t); P' then
22        known ← known ∪ {t}
23        return flushBuffers( );
24           in(mch(c), t); doChecks(delayedExps); out(c, t); a2m$^P$(P')

The proxy interposes and relays messages from/to the monitored inattentive participant, after performing the intended security checks. A point here is that the monitor needs to keep track of the values that are already in its knowledge and those which are generated by the monitored participant and become known only after receiving them. A security check can only be executed when all the required values are part of the monitor knowledge.

The a2msw function, instead, is defined on top of a2mp and the ideal UA process. This recalls that a service worker is a client-side defense (this is the reason for the dependency on UA) that acts as a reverse proxy: a subset of the checks of both the server and the client side can be encoded into the final process running on the client. The function has three main responsibilities: (i) rewriting the proxy to be compatible with the service worker API; (ii) removing the channels and values that a service worker is not able to observe; (iii) plugging the security checks made by the ideal UA process into the service worker.

Figure 3:
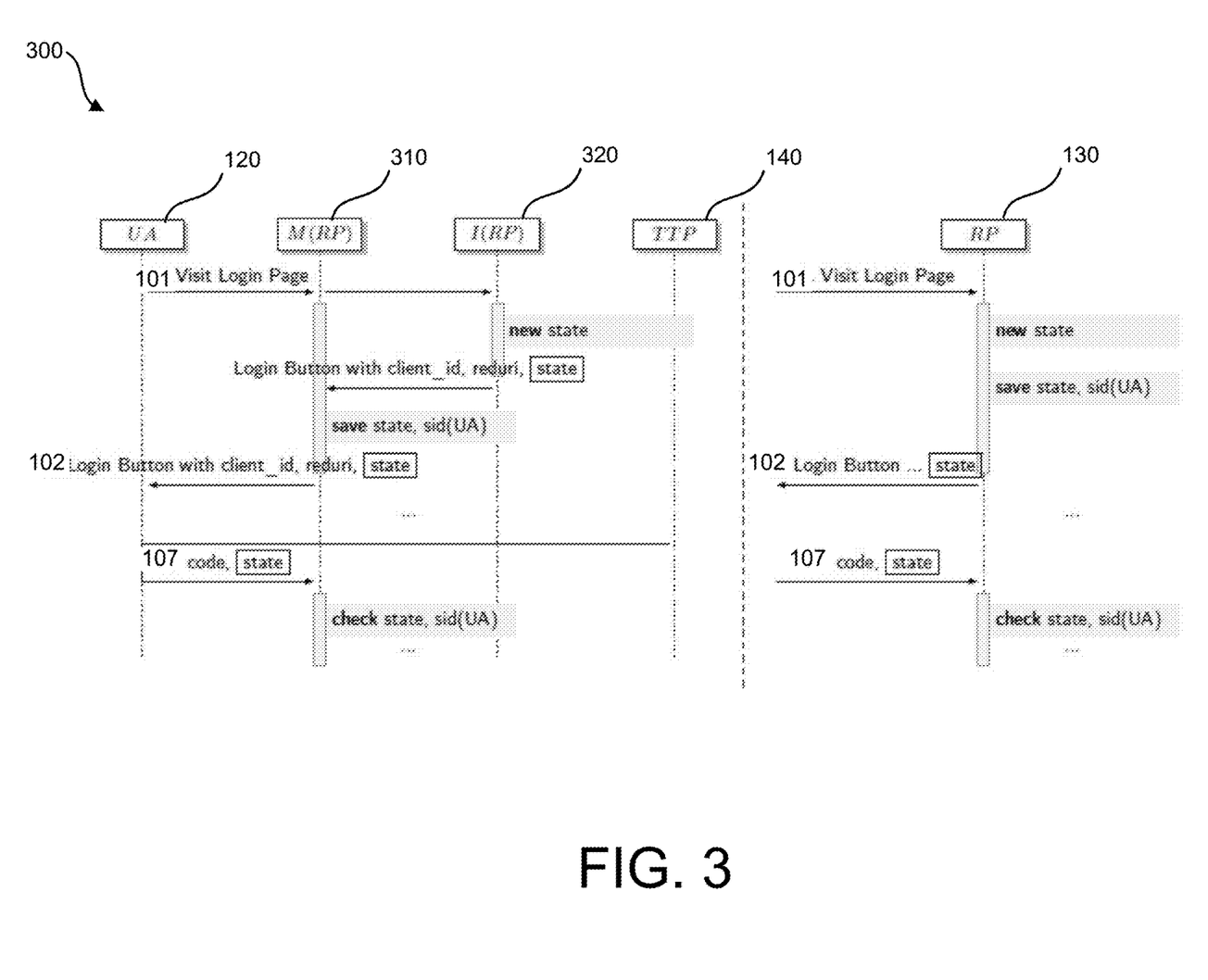
FIG. 3 is a messaging diagram illustrating aspects relating to the provision of holistic and verified security of monitoring protocols.

FIG. 3 is a diagram 300 that illustrates how the RP 130 of the OAuth 2.0 example of FIG. 1 is replaced by I(RP) 320, an inattentive variant of that RP in which the state parameter invariant is not checked. The right-hand side of FIG. 3 presents the RP 130 as in FIG. 1 with a few more details on its internals, according to the ideal specification: (i) upon reception of message 101, the RP 130 issues a new value for state and saves it together with the UA session cookie identifier (i.e., state is bound to the client session sid(UA)); and (ii) upon reception of message 107, the RP 130 checks the state parameter and its binding to the client session. The inattentive version I(RP) 32-, as generated by Bulwark, is shown on the left-hand side of FIG. 3: the state is neither saved by I(RP) 320 nor checked afterward. The left-hand side of FIG. 3 also shows the proxy M(RP) 310 generated by Bulwark as a2mp(RP) to enforce the state parameter invariant at RP 130. It is seen that the saving and the checking of state are performed by M(RP) 310. It is worth noticing that the M(RP) 310 can only save state upon reception of message 2 from I(RP) 320. The service worker monitor a2msw(RP) would look very similar to M(RP) 310.

Finally, Bulwark produces a monitored specification where each inattentive protocol participant deploys a security monitor both at the client side (service worker) and at the server side (proxy). However, this might be overly conservative, e.g., a single service worker might already suffice for security. To optimize ease of deployment, Bulwark runs again the PVT on the possible monitor deployment options, starting from the most convenient one, until it finds a setting which satisfies the security properties of the ideal specification. As an example, consider the system in which the only inattentive participant is the RP. There are three possible options, in decreasing order of ease of deployment (recall that || indicates the standard process parallel composition operator):

1. TTP||I(RP)||(a2m$^{sw}$(RP;UA)||UA), where the monitor is deployed as a service worker registered by the RP at the UA;

2. TTP||(I(RP)||a2m$^{p}$(RP))||UA, where the monitor is a proxy at RP;

3. TTP||(I(RP)||a2m$^{p}$(RP))||(a2m$^{sw}$(RP;UA)||UA), with both.

The first option which passes the PVT verification is chosen by Bulwark.

Monitor Generation. Finally, as part of the monitor generation phase 230, Bulwark translates the PVT monitor processes into real service workers (written in JavaScript) or proxies (written in Python, etc.), depending on their placement in the monitored specification. This is a relatively direct one-to-one translation, whose key challenge is mapping the PVT messages to the real HTTP messages exchanged in the web protocol. Specifically, different RPs integrating the same TTP will host the protocol at different URLs and each TTP might use different names for the same HTTP parameters or rely on different message encodings (JSON, XML, etc.).

Bulwark deals with this problem by means of a configuration file, which drives the monitor generation process by defining the concrete values of the symbols and data constructors that are used by the PVT model. When the generated security monitor needs to apply an action in response to a trigger such as a data destructor on a name, the generated security monitor searches the configuration file for its definition and calls the corresponding function that deconstructs the object into its components. Since data constructors/destructors are directly written in the target language as part of the monitor configuration, different implementations can be generated for the same monitor, so that a single monitor specification created for a real-world participant e.g., the Google TTP, can be easily ported to others, e.g., the Facebook TTP, just by tuning their configuration files.

Experimental Evaluation. To show Bulwark at work, core MPWA scenarios are illustrated. For this experimental evaluation, PVT was used as the ProVerif tool with the Web Spi library. First, ideal specifications of the OAuth 2.0 explicit protocol and the PayPal payment system in ProVerif+WebSpi are written. Appropriate correspondence assertions and secrecy queries are defined which rule out all the attacks in Table 1 and known fixes are applied until ProVerif is able to prove security for the ideal specifications. Then, a set of case studies representative of the key vulnerabilities plaguing these scenarios were set up (see Table 2). In particular, vulnerabilities from Table 1 were selected so as to evaluate Bulwark on both the RP and TTP via a combination of proxy and service worker monitors. For each case study, a set of inattentive participants were chosen and network traces were collected to define the Bulwark configuration files mapping ProVerif messages to actual protocol messages. Finally, Bulwark was used to generate and deploy appropriate security monitors.

TABLE 2

Test set of vulnerable applications

| CS | RP | TTP | Protocol | Vuln. (Tab. 1) |
|---|---|---|---|---|
| 1 | artificial RP 1 | artificial IdP | OAuth 2.0 explicit | #13 #17 |
| 2 | artificial RP 2 | facebook.com | OAuth 2.0 exp. (graph-sdk 5.7) | #13 |
| 3 | artificial RP 3 | vk.com | OAuth 2.0 exp. (vk-php-sdk 5.100) | #13 |
| 4 | artificial RP 4 | google.com | OAuth 2.0 exp. (google/apiclient 2.4) | #13 |
| 5 | overleaf.com | google.com | OAuth 2.0 explicit | #13 #14 |
| 6 | osCommerce 2.3.1 | paypal.com | PayPal Standard | #18 #20 |
| 7 | NopCommerce 1.6 | paypal.com | PayPal Standard | #18 |
| 8 | TomatoCart 1.1.15 | paypal.com | PayPal Standard | #21 |

Case Studies. A range of possibilities for OAuth 2.0 were considered. One starting point was from an entirely artificial case study in which the RP and the TTP were both developed introducing known vulnerabilities in both parties (CS1). Integration scenarios with three major TTPs, i.e., Facebook, VK and Google, were used to develop vulnerable RPs on top of public SDKs (CS2-CS4). Finally, a case study was considered in which there is no control of any party, i.e., the integration between Overleaf and Google (CS5). This scenario was chosen because the lack of the state parameter in the Overleaf implementation of OAuth 2.0 introduces known vulnerabilities. To evaluate the CaaS scenario, legacy versions of three popular e-commerce platforms were selected that suffer from known vulnerabilities in their integration with PayPal, in particular osCommerce 2.3.1 (CS6), NopCommerce 1.6 (CS7) and TomatoCart 1.1.15 (CS8).

Evaluation criteria. Each case study was evaluated in terms of four key aspects: (i) security: to experimentally confirm that the monitors stop the exploitation of the vulnerabilities; (ii) compatibility: to experimentally verify that the monitors do not break legitimate protocol runs; (iii) portability: to assess whether the ideal specifications can be used without significant changes across different case studies; and (iv) performance: to show that the time spent to verify the protocol and generate the monitors is acceptable for practical use.

Experimental Results. The evaluation results are summarized in Table 3 and discussed below. In the case studies, the possible sets of known-to-be vulnerable parties were considered as inattentive participants, leading to 10 experiments; when multiple experiments can be handled by a single run of Bulwark, their results are grouped together in the table, e.g., the experiments for CS2-CS4. Notice that for CS1, three sets of inattentive participants were considered: only TTP (vulnerability #17); only RP (vulnerability #13); and both RP and TTP (both vulnerabilities). Hence, there are three experiments for CS1, three experiments for CS2-CS4, one experiment for CS5 and three experiments for CS6-CS8.

figuration files. However, the state parameter is not mandatory in the OAuth2 standard and thus TTPs tend to allow integration also with RPs that do not issue it. Case study CS5 captures this variant of OAuth 2.0: removing the state parameter from IS1 is sufficient to create a new ideal specification IS1*, which enables Bulwark towards these scenarios as well. As to PayPal, the ideal specification IS2 is portable to all the case studies CS6-CS8. Overall, the experiments indicate that once an ideal specification is created for a protocol, then it is straightforward to reuse it on other integration scenarios based on the same protocol.

Figure 4:
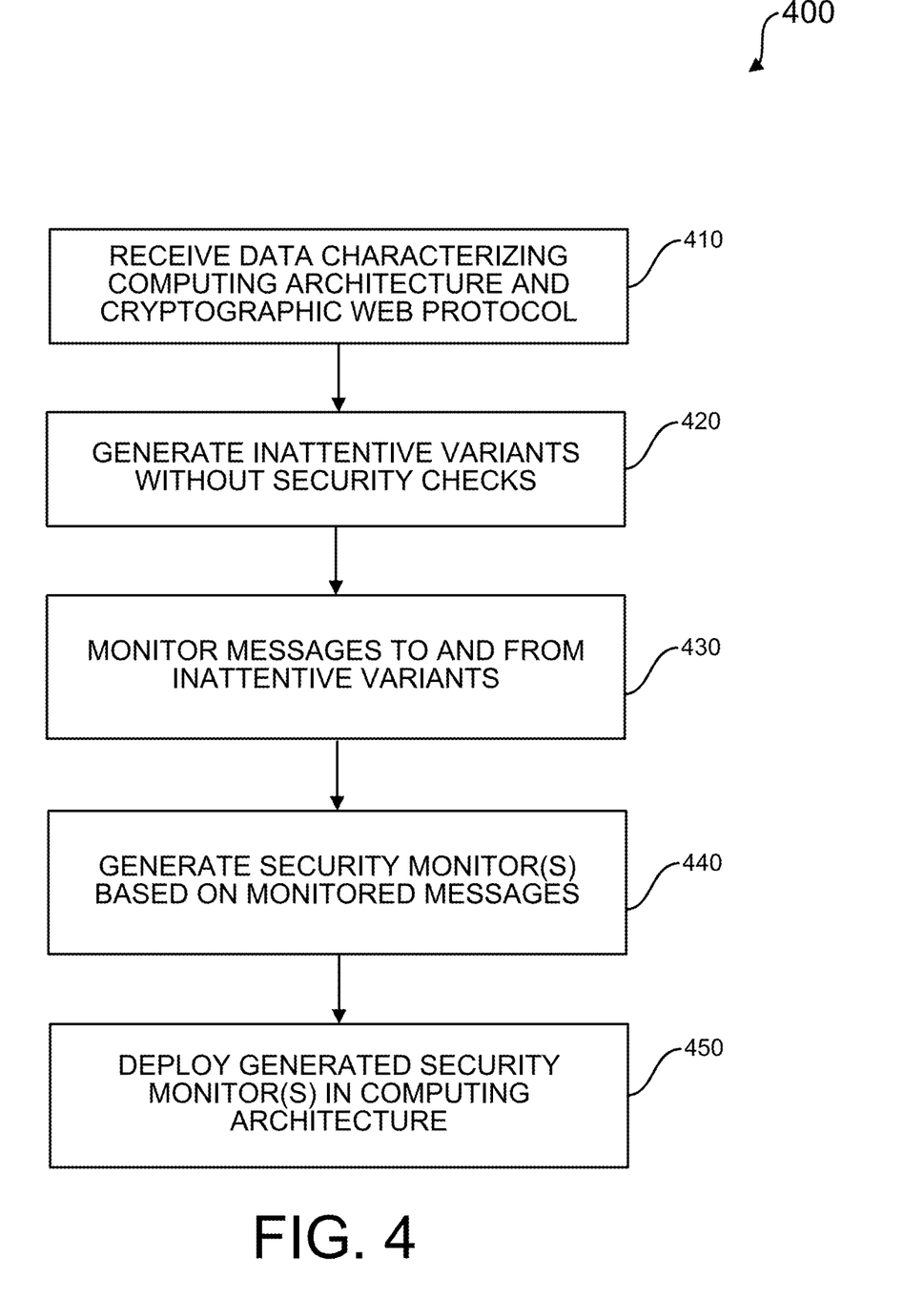
FIG. 4 is a process flow diagram illustrating the provision of holistic and verified security of monitoring protocols.

FIG. 4 is a diagram 400 in which, at 410, data is received that characterizes a computing architecture including at least one web-based server and an associated cryptographic web protocol to be implemented on such computing architecture according to a desired formal specification (e.g., a PVT model). Thereafter, at 420, a plurality of inattentive variants are generated that comply with the web protocol but which do not have associated security checks. Messages are then monitored, at 430, to and from each inattentive variant while executing the associated security checks. At least one security monitor is then generated, at 440, based on the monitored messages that is configured to address security vulnerabilities in the computing architecture relative to the formal specification. The generated at least one security monitor can, at 450, be deployed in the computing architecture.

TABLE 3

Generated monitors and run-time

| CS | Ideal Spec. | Verification Time | Inattentive Parties | Monitor Verification time | # verif. | Gen. Monitors RP sw | RP proxy | TTP sw | TTP proxy | Prevented Vuln. |
|---|---|---|---|---|---|---|---|---|---|---|
| 1 | IS1 | 29 m | TTP | 41 m | 2 | x | x | x | ✓ | #17 |
|   |     |      | RP  | 15 m | 1 | ✓ | x | x | x | #13 |
|   |     |      | RP, TTP | 54 m | 3 | ✓ | x | x | ✓ | #13 #17 |
| 2 3 4 | IS1 | 27 m | RP | 18 m | 1 | ✓ | x | x | x | #13 |
| 5 | IS1* | 19 m | RP | 17 m | 1 | ✓ | x | x | x | #13 #14 |
| 6 7 8 | IS2 | 3 m | RP | 8 m | 1 | x | ✓ | x | x | #18 #20 #21 |

Security and Compatibility. To assess security and compatibility, manual tests were created to exploit each vulnerability of in the case studies and were run with and without the Bulwark generated monitors. In all the experiments, it was confirmed that the known vulnerabilities were prevented only when the monitors were deployed (security) and that legitimate protocol runs were able to be completed successfully both with and without the monitors (compatibility). Table 3 illustrates that five experiments can be secured by a service worker alone, four experiments can be protected by a server-side proxy and only one experiment needed the deployment of two monitors. This heterogeneity confirms the need of holistic security solutions for web protocols.

Figure 5:
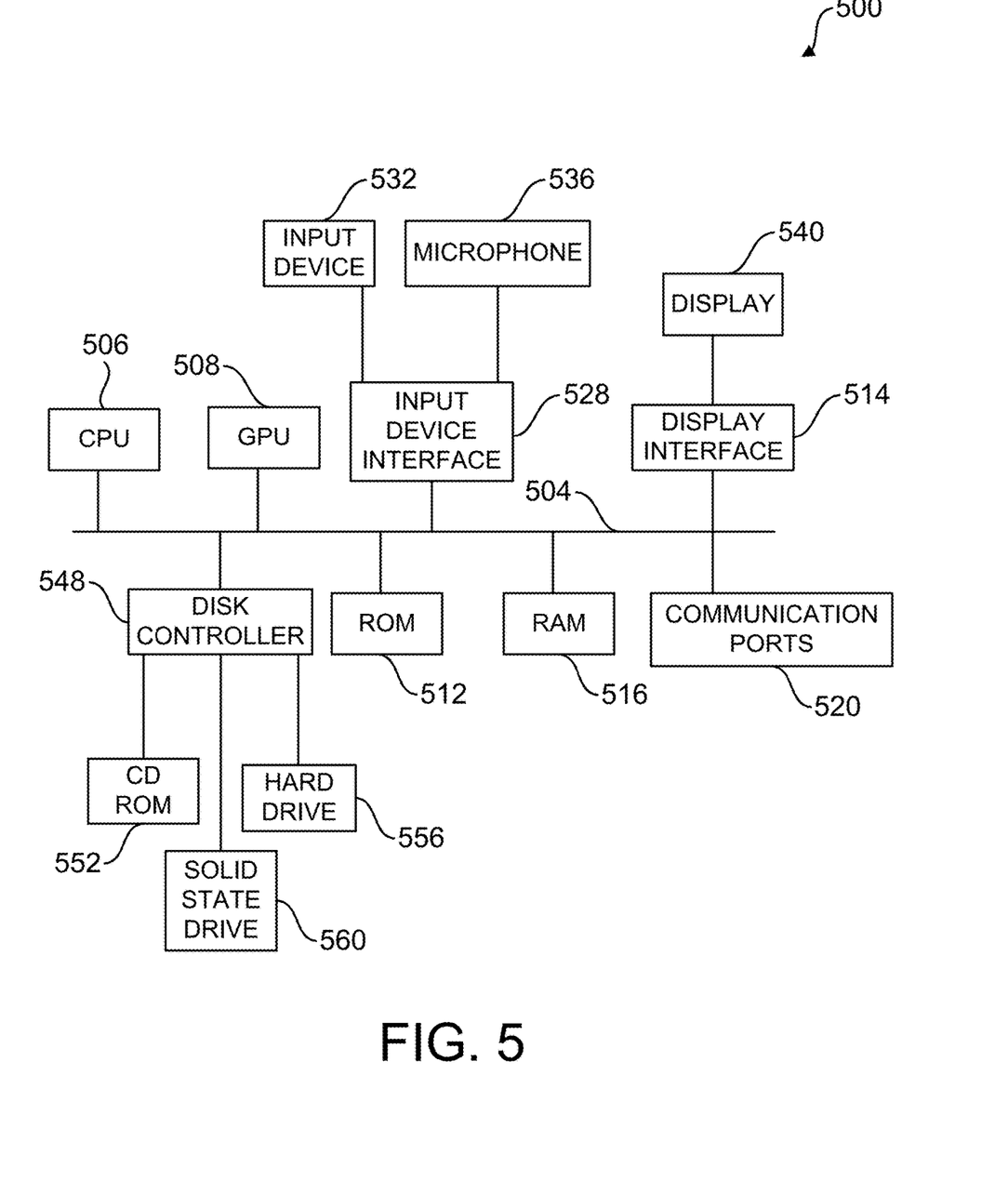
FIG. 5 is a diagram illustrating a computing device for implementing aspects of the current subject matter.

Portability. It can be seen that the ideal specification IS1 created for the first case study CS1 is portable to CS2-CS4 without any change. This means that different TTPs supporting the OAuth 2.0 explicit protocol like Facebook, VK and Google can use Bulwark straightaway, by just tuning the configuration file to their settings. This arrangement allows for the protection of integration scenarios with RPs that make use of the state parameter. This is noteworthy as different TTPs typically vary on a range of subtle details, which are all accounted for correctly by the Bulwark con- FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data characterizing a computing architecture including at least one web-based server and an associated cryptographic web protocol to be implemented on such computing architecture according to a desired formal specification, the desired formal specification defining associated security checks;
   replacing each of one or more cryptographic web protocol participants with an inattentive variant, wherein an inattentive variant is a cryptographic web protocol participant complies with the cryptographic web protocol but does not comply with the associated security checks;
   monitoring messages to and from the one or more inattentive variants while executing the associated security checks;
   generating one or more security monitors based on the monitored messages that are configured to address security vulnerabilities in the computing architecture, identified during the monitoring, relative to the formal specification; and deploying at least one generated security monitor in the computing architecture.

2. The method of claim 1, wherein the deploying comprises: deploying a service worker registered by a relying party at a user agent.

3. The method of claim 1, wherein the deploying further comprises: deploying a proxy at a relying party.

4. The method of claim 1, wherein the deploying comprises: deploying a proxy at a trusted third party.

5. The method of claim 1, wherein the deploying comprises: deploying a service worker registered by a trusted third party at a user agent.

6. The method of claim 1 further comprising:
searching, by at least one generated security monitor in response to a trigger, a configuration file for a definition; and
calling a function specified by the definition to deconstruct an object into its components.

7. The method of claim 6, wherein the object is a hypertext transfer protocol (HTTP) message.

8. The method of claim 1, wherein the generating of the at least one security monitor comprises iterating through a plurality of different available modifications to the computing architecture until a modification having a combination of inattentive participants and generated security monitors that complies with an ideal specification for the web protocol is identified.

9. The method of claim 8, wherein the different available modifications are iterated through based on increasing costs for deployment.

10. A system method comprising:
at least one data processor; and
memory comprising instructions which, when executed by the at least one data processor, result in operations comprising:
receiving data characterizing a computing architecture including at least one web-based server and an associated cryptographic web protocol to be implemented on such computing architecture according to a desired formal specification, the desired formal specification defining associated security checks;
replacing each of one or more cryptographic web protocol participants with an inattentive variant, wherein an inattentive variant is a cryptographic web protocol participant complies with the cryptographic web protocol but does not comply with the associated security checks;
monitoring messages to and from the one or more inattentive variants while executing the associated security checks;
generating one or more security monitors based on the monitored messages that are configured to address security vulnerabilities in the computing architecture, identified during the monitoring, relative to the formal specification; and
deploying at least one generated security monitor in the computing architecture.

11. The system of claim 10, wherein the deploying comprises: deploying a service worker registered by a relying party at a user agent.

12. The system of claim 10, wherein the deploying further comprises: deploying a proxy at a relying party.

13. The system of claim 10, wherein the deploying comprises: deploying a proxy at a trusted third party.

14. The system of claim 10, wherein the deploying comprises: deploying a service worker registered by a trusted third party at a user agent.

15. The system of claim 10, wherein the operations further comprise:
searching, by at least one generated security monitor in response to a trigger, a configuration file for a definition; and
calling a function specified by the definition to deconstruct an object into its components.

16. The system of claim 15, wherein the object is a hypertext transfer protocol (HTTP) message.

17. The system of claim 10, wherein the generating of the at least one security monitor comprises iterating through a plurality of different available modifications to the computing architecture until a modification having a combination of inattentive participants and generated security monitors that complies with an ideal specification for the web protocol is identified.

18. The system of claim 17, wherein the different available modifications are iterated through based on increasing costs for deployment.

19. A non-transitory computer program product storing instructions which, when executed by at least one computing device, result in operations comprising:
receiving data characterizing a computing architecture including at least one web-based server and an associated cryptographic web protocol to be implemented on such computing architecture according to a desired formal specification, the desired formal specification defining associated security checks;
replacing each of one or more cryptographic web protocol participants with an inattentive variant, wherein an inattentive variant is a cryptographic web protocol participant complies with the cryptographic web protocol but does not comply with the associated security checks;
monitoring messages to and from the one or more inattentive variants while executing the associated security checks;
generating one or more security monitors based on the monitored messages that are configured to address security vulnerabilities in the computing architecture, identified during the monitoring, relative to the formal specification; and
deploying at least one generated security monitor in the computing architecture.

20. The non-transitory computer program product of claim 19, wherein the deploying comprises:
deploying a service worker registered by a relying party at a user agent;
deploying a proxy at a relying party;
deploying a proxy at a trusted third party; and
deploying a service worker registered by a trusted third party at a user agent.

* * * * *